United States Patent
Schultze

(10) Patent No.: US 7,949,009 B2
(45) Date of Patent: May 24, 2011

(54) METHOD FOR DETERMINING MULTITURN MODULO MASTER AXIS DATA

(75) Inventor: Stephan Schultze, Lohr (DE)

(73) Assignee: Robert Bosch GmbH, Stutgart (DE)

( * ) Notice: Subject to any disclaimer, the term of this patent is extended or adjusted under 35 U.S.C. 154(b) by 354 days.

(21) Appl. No.: 12/339,170

(22) Filed: Dec. 19, 2008

(65) Prior Publication Data

US 2009/0161691 A1 Jun. 25, 2009

(30) Foreign Application Priority Data

Dec. 21, 2007 (DE) .................. 10 2007 062 333

(51) Int. Cl.
*H04J 3/22* (2006.01)

(52) U.S. Cl. ....................... 370/465; 345/589

(58) Field of Classification Search .............. 370/232, 370/209, 465; 345/589
See application file for complete search history.

(56) References Cited

U.S. PATENT DOCUMENTS

| 4,370,720 | A | * | 1/1983 | Hyatt ........................... 700/194 |
| 5,151,919 | A | * | 9/1992 | Dent ............................ 370/209 |
| 6,292,196 | B1 | * | 9/2001 | Fukunaga et al. ............ 345/589 |
| 6,973,535 | B2 | * | 12/2005 | Bruner et al. ................. 711/112 |
| 7,590,063 | B2 | * | 9/2009 | Binns ........................... 370/232 |
| 2006/0056319 | A1 | | 3/2006 | Markert et al. |
| 2007/0189326 | A1 | | 8/2007 | Schultze |

FOREIGN PATENT DOCUMENTS

| DE | 102 46 007 | 4/2004 |
| DE | 10 2006 006 508 | 8/2007 |
| EP | 0 930 158 | 7/1999 |

* cited by examiner

*Primary Examiner* — Thong H Vu
(74) *Attorney, Agent, or Firm* — Michael J. Striker

(57) ABSTRACT

The present invention relates to a method for transmitting multiturn modulo control axis data which includes at least one control axis position value (600°-604°; 245°-248°) and an associated control axis modulo value (720°; 360°) in one communication system which includes at least two participants, at least one real-time data transmission channel (CH1) being provided for the cyclic transmission of data between the participants; the at least one control axis position value (600°-604°; 245°-248°) is transmitted together with the associated control axis modulo value (720°; 360°) in one data telegram (22; 33).

14 Claims, 1 Drawing Sheet

METHOD FOR DETERMINING MULTITURN MODULO MASTER AXIS DATA

CROSS-REFERENCE TO RELATED APPLICATION

The invention described and claimed hereinbelow is also described in German Patent Application DE 10 2007 062 333.1 filed on Dec. 21, 2007. This German Patent Application, whose subject matter is incorporated here by reference, provides the basis for a claim of priority of invention under 35 U.S.C. 119(a)-(d).

BACKGROUND OF THE INVENTION

The present invention relates to a method for transmitting multiturn modulo control axis data, a related participant in a communication system, a related computer program, and a related computer program product.

BACKGROUND INFORMATION

Automation tasks that are performed by shaftless machines are usually carried out with the aid of a "control axis". A control axis typically provides angular position information or speed information as a reference which represents the cycle time of the machine. The control axis position represents the position of a vertical shaft.

The control axis information is typically calculated and distributed in a controller (a "virtual control axis"), but it may also originate from a mechanically installed position sensor, a "control axis sensor" (a "real control axis"). The control axis position is transmitted to drives and to further controllers.

Several known solutions for designing this communication exist in the field of field busses, such as Profibus, Profinet, CIPmotion, CAN Bus, SERCOS interface, etc. The control axis information is transmitted, e.g. as a numerical value via the communication system to the recipients which may be actuators (drives) or controllers which may, in turn, forward the information to actuators connected thereto. The transmission of the control axis position from the controller to the particular recipients must take place in a synchronized manner, so that the particular processing steps take place in an accurately timed manner.

"Modulo axes" are endlessly moving axes, i.e. their position value is unlimited. In contrast, absolute axes have a finite position range within which they move. The depiction of the position of modulo axes is provided with an overrun, the "module value".

In the case of a modulo control axis, the control axis position is reset after one pass or cycle, and starts anew, wherein, e.g. position 360° corresponds to position 0°. The recipients of the control axis position must know the "module value" of the control axis, e.g. 360° in the example described above, in order to be able to process the jump in position, the "modulo overrun".

If one processing run or cycle, e.g. one rotation of a print roller, is always carried out per one rotation of the control axis, this is referred to as a single-turn control axis. A multi-turn solution is preferred whenever one processing run of a processing device includes several control axis revolutions. This may be the case, e.g. for a machine module which performs manufacturing and packaging, in the case of which one single product is manufactured per one revolution of the control axis, but, at another station, several individual products are packaged to form a single unit. The processing cycle of the packaging machine therefore includes several revolutions of the control axis.

It is known, in order to operate machine configurations of this type, to transmit the control axis position as a control axis revolution counter value. A transmission method of this type is known, e.g. by the name CIPmotion. In this transmission method, information related to the control axis position is transmitted in a synchronous manner together with the information related to the modulo value of the (single) control axis. A revolution counter of the control axis is also transmitted. This revolution counter does not include a settable module value, however; instead, its modulo overrun takes place at the numerical limit (e.g. 32 bit). It is therefore a relatively complex undertaking to implement a multiturn application for processing runs which have a different number of control axis revolutions when CIPmotion is used.

Another system for transmitting multiturn control axis information is known by the name SYNAX, in which a transmission method based on the "SERCOS interface" standard is used for transmission. In a SYNAX system, different module values are supported for the devices that are attached, it being possible for the control axis position that is defined and that will be transmitted to include several revolutions (e.g. 0° to 720°). It is provided that different control axes are generated for different recipients. In the example described above, a parametrized modulo value of 360° and a control axis position of 0° to 360° would be transmitted to the machine module to be created, while, for the packaging machine module, e.g. a modulo value of N×360°, parametrized, and a control axis position of 0° to N×360° would be transmitted, in order to package N individual products in one container. It is known to transmit N as a "control axis cycle".

In the transmission method used in SYNAX, a transmission channel is provided for cyclic, real time-capable data transmission, and a transmission channel is provided for acyclical data transmission. In cyclical data transmission, only the control axis position is transmitted in real time. If the multiturn modulo value must be changed, the pertinent information is separated from the control axis position, either in the acyclic channel or via a multiplex transmission in the cyclic channel. The point in time when the transmission takes place is therefore not definitely known, i.e. the information about the control axis position and the associated (multiturn) modulo value are not present in the recipients in a reliably consistent manner. It is therefore common to halt production, transmit the new multiturn modulo value to the particular recipients, correct the control axis position, if necessary, and to restart production. Time is lost when this takes place. In addition, waste is typically produced when the processing units are braked and then reaccelerated. In addition, it is often necessary to deactivate the recipients (e.g. by removing a drive release). Depending on the process being carried out, this may result in disruptions, e.g. a taut web becoming slack, which, in turn, causes disruptions when the machine is restarted.

SUMMARY OF THE INVENTION

The object of the present invention, therefore, is to provide an improved method for transmitting multiturn modulo control axis information.

This object is attained via a method for transmitting multiturn modulo control axis data, a related participant in a communication system, a related computer program, and a related computer program product having the features of the invention. Advantageous developments are the subject matter of the description that follows.

The applicable multiturn modulo value is transmitted in one data telegram simultaneously with the control axis position in the multiturn format. This automatically results in data consistency of the multiturn control axis position and the associated multiturn modulo value. There is no need to ensure the consistency using complex mechanisms. It is understood that the multiturn modulo value may also be designed as a modulo revolution counter for multiplication with a single control axis revolution.

A participant—according to the present invention—of a communication system is set up to carry out a method according to the present invention, and it includes the necessary means therefor.

It is preferable for a participant to monitor the control axis modulo value that is transmitted in the data telegram, and, if a change in the control axis module value is detected, the participant adjusts its axle position based on the control axis modulo value and the previous control axis module value. It is therefore possible to reparametrize participants during ongoing production, since they automatically detect a change in the modulo value and correct their axle or drive position accordingly in order to continue operation using the control axis position value that is based on the new modulo value.

The control axis position value is advantageously transmitted together with the associated control axis modulo value in one data telegram in the at least one real-time data transmission channel. The multiturn modulo value (or a corresponding numerical value, e.g. a module revolution counter) is transmitted simultaneously with the transmission of the control axis position in the multiturn format. Data consistency of the multiturn control axis position and the corresponding multiturn modulo value of the control axis results automatically. There is no need to ensure the consistency using complex mechanisms.

Expediently, at least one non-real-time data transmission channel is provided between the participants in the communication system, the at least one control axis position value being transmitted together with the associated control axis modulo value in the at least one non-real-time data transmission channel. A change in the multiturn modulo value for a certain participant may be advantageously carried out via a non-real-time channel using a defined sequence. A control axis position which may have been changed is transmitted along with the new multiturn modulo value. Via the defined sequence, it is ensured that the multiturn modulo value and the internal control axis position actual value become effective simultaneously as a consistent data pair, and that they may be processed correctly by the participant, since the change in the multiturn modulo value and the adjustment of the control axis position which may need to be carried out take place at the same time.

As an alternative, the conversion may take place using a command that reports a change, with the result that monitorings or calculations that may be taking place in the participant are preferably shut off. After the command, the multiturn modulo value and the control axis position are transmitted. When the command has come to an end, the participant jumps to the new values and reactivates the monitoring and/or calculation.

According to a preferred embodiment, the communication system uses data transmission based on the "SERCOS interface" standard, and, in particular, based on "SERCOS III". A SYNAX network may be used in particular as the communication system. For example, up to two control axes per motion control controller may be calculated in SYNAX 200. Individual machine modules or complete machine units may be integrated easily and in a transparent manner in linked and synchronized production processes. The cascadable multiturn control axes are transmitted to the servo drives as setpoint position values having digital accuracy. Using the SERCOS interface as the drive bus (IEC 61491/EN 61491) ensures that transmission to the individual drives of the machine units takes place without disruption. The Sercos interface defines cyclical, synchronous, and equidistant data communication between a communication master (typically: MC control) and a plurality of communication slaves (typically: drives or decentralized I/O stations). The data that are sent from the master to the slaves in a cyclic manner are contained in the master data telegram (MDT) and in one (Sercos III) or several (Sercos II) drive data telegrams (AT), wherein, according to the present invention, the at least one control axis position value is transmitted together with the associated value in one data telegram.

The present invention also relates to a computer program having program code means which are suited to carrying out a method according to the present invention when the computer program is run on a computer or a related arithmetic unit, in particular in a participant—according to the present invention—of a communication system.

The computer program product that is provided according to the present invention includes program code means that are stored on a computer-readable data storage device and that are suited to carrying out a method according to the present invention when the computer program is run on a computer or a related arithmetic unit, in particular in a participant—according to the present invention—of a communication system. Suitable data storage devices are, in particular, diskettes, hard drives, Flash drives, EEPROMs, CD-ROMs, DVDs, etc. It is also possible for a program to be downloaded from computer networks (Internet, intranet, etc.).

Further advantages and embodiments of the present invention result from the description and the attached drawing.

It is understood that the features mentioned above and to be described below may be used not only in the combination described, but also in other combinations or alone, without leaving the scope of the present invention.

The present invention is depicted schematically with reference to an exemplary embodiment in the drawing, and it is described in detail below with reference to the drawing.

DESCRIPTION OF THE PREFERRED EMBODIMENTS

Figure 1:
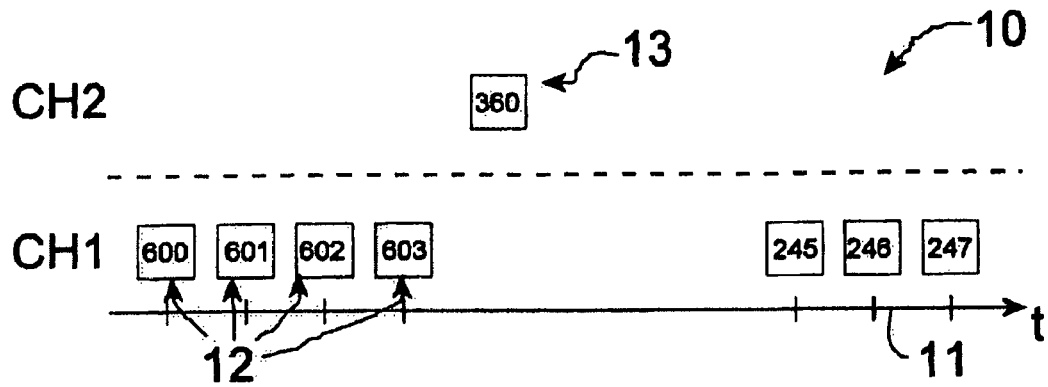
FIG. 1 shows a schematic depiction of a transmission of multiturn modulo control axis data according to the prior art.
Figure 2:
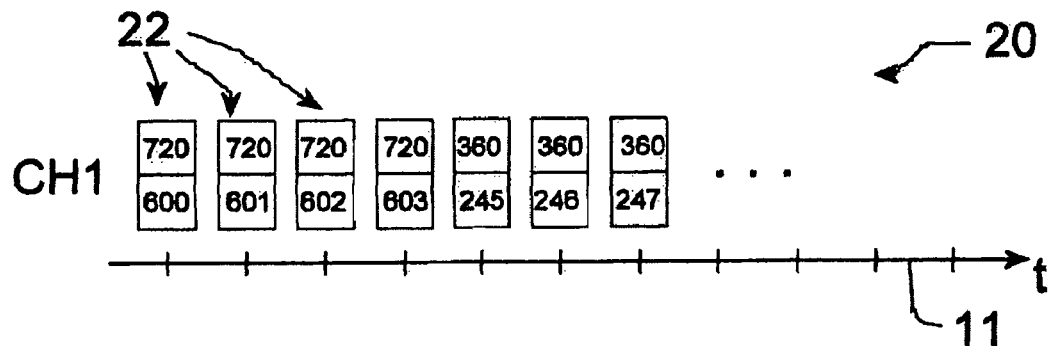
FIG. 2 shows a first embodiment of a transmission—according to the present invention—of muliturn modulo control axis data.
Figure 3:
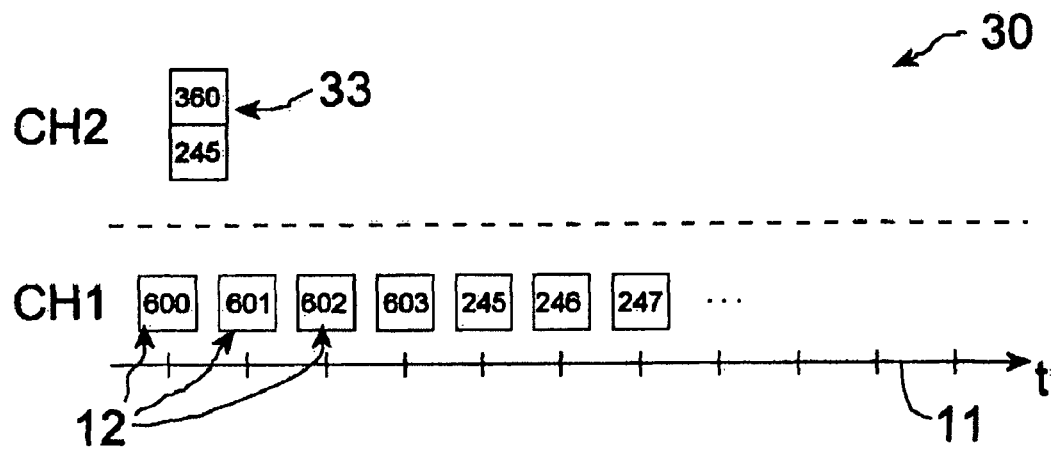
FIG. 3 shows a second embodiment of a transmission—according to the present invention—of multiturn modulo control axis data.

FIGS. 1 through 3 illustrate one possibility from the prior art and two possibilities according to the present invention of changing a control axis modulo value from its initial parametrized value of 720° to 360°, and of correcting the control axis position accordingly. The change should take place after control axis position 604°.

FIG. 1 shows a schematic illustration of a related control axis data transmission in the prior art. The transmission shown may take place using the "SERCOS interface" standard on a SYNAX network. A time t is plotted on an x-axis 11 in a diagram 10. A first data transmission channel CH1 and a second data transmission channel CH2 are shown in the diagram. Data transmission channel CH1 is designed as a real-time data transmission channel, and data transmission channel CH2 is designed as a non-real time data transmission channel. Data telegrams 12 which include control axis position values are transmitted in a cyclic manner in real-time data transmission channel CH1. The cyclic data transmission is depicted via the equidistant placement along x-axis 11. Initially, control axis position values of 600° to 604° are transmitted in a cyclic manner using data telegrams 11.

To reparametrize the related participant in the communication system, as desired, production is halted after control axis position value 604°, i.e. the controller release of the axes is withdrawn from the recipients. Control axis position values that are received after that are not processed by the recipients.

After production has been halted, a data telegram 12 which includes a new control axis modulo value is transmitted in non-real-time data transmission channel CH2. The new control axis modulo value is 360°. Since the transmission in non-real-time data transmission channel CH2 does not take place in a secured or real-time manner, a waiting period of sufficient length must occur in order to ensure that data telegram 13 has been received by all appropriate participants in the communication system. After data telegram 13 with new control axis modulo value 360° has been received by the related participants, they parametrize control axis modulo value 360°. The control axis position is corrected accordingly, and the transmission then takes place with corrected control axis position value 245° via real-time data transmission channel CH1 after the necessary waiting period has expired. Before transmission takes place, the recipients are reactivated by setting the controller release of the axes.

FIG. 2 shows a diagram 20 of a first embodiment of a transmission—according to the present invention—of multiturn modulo control axis data. In the transmission depicted in FIG. 2, the control axis position values are transmitted along with the associated control axis modulo value in a data telegram 22 in real-time data transmission channel CH1. In particular, control axis position values 600° through 604° are transmitted together with associated control axis modulo value 720°, wherein control axis position values 245° through 248° are transmitted after conversion with associated control axis modulo value 360°. The participants in the communication system therefore receive a control axis position value simultaneously with the associated control axis modulo value in one data telegram via the real-time data transmission channel. The correct control axis position value with the correct associated control axis modulo value is therefore reliably available at any time, thereby making it possible to reparametrize the participants in the communication system during production without the need to halt production.

Every associated participant detects the change in the control axis modulo value from 720° to 360° and adapts its axle position automatically, e.g. the angular position of a print axle, to the new modulo value. This means that axle positions=360° remain unchanged, and axle positions between 360° and 720° are corrected by 360°. The control axis position is corrected in the same manner, so that transmission is continued with corrected control axis position value 245°.

FIG. 3 shows a schematic depiction of a second embodiment of the transmission—according to the present invention—of multiturn modulo control axis data, in a diagram 30. In the transmission of multiturn modulo control axis data depicted, the control axis position values are transmitted during production in data telegrams 12 in real-time data transmission channel CH1. According to the solution according to the present invention, which is depicted, corrected control axis position value 245° is transmitted together with associated control axis modulo value 360° in a data telegram 33 in non-real-time data transmission channel CH2 in order to reparametrize the appropriate participants in the communication system. The transmission of data telegram 33 takes place in real time before the desired instant of conversion, thereby ensuring that data telegram 33 will be received by the particular participants in the communication system before the instant when conversion takes place.

The related participants in the communication system obtain the information from data telegram 33 that was received stating that new control axis modulo value 360° must be parametrized when control axis position value 245° is received. In the next step, the data telegram with control axis position value 245° is therefore transmitted to the related participants in the communication system in real-time data transmission channel CH1 after the data telegram with control axis position value 604°, and the related participants carry out the desired reparametrization.

Via the embodiments of the present invention described, transmission of multiturn modulo control axis data takes place between the participants in a communication system, thereby making it possible to reparametrize the control axis under operating conditions and without halting production.

It is understood that only one particularly preferred embodiment of the present invention is depicted in the figures shown. Any other type of embodiment is also feasible, without leaving the scope of the present invention.

LIST OF REFERENCE NUMERALS

10 Schematic depiction of the data transmission in the prior art
11 x-axis t
12, 13 Data telegram
20, 30 Schematic depiction of data transmission according to the present invention
22, 33 Data telegram
CH1 Real-time data transmission channel
CH2 Non-real-time data transmission channel

What is claimed is:

1. A method for transmitting multiturn modulo control axis data, comprising the steps of:
    obtaining at least one control axis position value (600.degree.-604.degree.; 245.degree.-248.degree.);
    providing an associated control axis modulo value (720.degree.; 360.degree.) in one communication system which includes at least two participants, and at least one real-time data transmission channel (CH1) for the cyclic transmission of data between the participants;
    transmitting the at least one control axis position value (600.degree.-604.degree.; 245.degree.-248.degree.) together with the associated control axis modulo value (720.degree.; 360.degree.) in one data telegram (22; 33).

2. The method as recited in claim 1, wherein one participant modifies its axle position based on the control axis modulo value) (720°) and the previous control axis modulo value (360°).

3. The method as recited in claim 2, wherein the participant monitors the control axis modulo value (720°; 360°) that is transmitted in the data telegram (22; 33), and, if a change in the control axis modulo value) (720°) is detected, the participant adjusts its axle position based on the control axis modulo value (720°) and the previous control axis modulo value (360°).

4. The method as recited in claim 2, wherein the participant adjusts its axle position based on a command that was received.

5. The method as recited in claim 4, in which, based on the command that was received, internal monitorings and/or calculations of the participant are deactivated, and, after the command is terminated, internal monitorings and/or calculations of the participant are activated.

6. The method as recited in claim 1, wherein the control axis position value (600°-604°; 245°-248°), together with the associated control axis modulo value (720°; 360°), is transmitted in one data telegram (22) in the at least one real-time data transmission channel (CH1).

7. The method as recited in claim 1, wherein at least one non-real-time data transmission channel (CH2) is provided between the participants, the at least one control axis position value (245°) being transmitted together with the associated control axis modulo value (360°) in one data telegram (33) in the at least one non-real-time data transmission channel (CH2).

8. The method as recited in claim 1, wherein the communication system uses data transmission based on the "SERCOS interface" standard, and, in particular, based on "SERCOS III".

9. A computer program with program code means that are suited to carrying out a method as recited in claim 1 when the computer program is run on a computer or a related arithmetic unit, in particular a participant of a communication system.

10. A computer program product that includes program code means 1 that are stored on a computer-readable data storage device, and that are suited to carrying out a method as recited in claim 1 when the computer program is run on a computer or a related arithmetic unit, in particular a participant of a communication system.

11. A participant in a communication system which includes at least one real-time data transmission channel (CH1) for the cyclic data transmission between the participants, the participant being set up to transmit, in a data telegram (22; 33), multiturn modulo control axis data which includes at least one control axis position value (600°-604°; 245°-248°) and an associated control axis modulo value (720°; 360°).

12. The participant in a communication system as recited in claim 11, which is set up to transmit the control axis position value (600°-604°; 245°-248°) together with the associated control axis modulo value (720°; 360°) in a data telegram (22; 33) in the at least one real-time data transmission channel (CH1).

13. The participant in a communication system as recited in claim 11 wherein the communication system includes at least one non-real time data-transmission channel (CH2) between the participants, the participant being set up to transmit the at least one control axis position value (245°) together with the associated control axis modulo value (360°) in at least one non-real time data transmission channel (CH2).

14. The participant in a communication system as recited in claim 11, wherein the communication system uses data transmission based on the "SERCOS interface" standard, and, in particular, based on "SERCOS III".

* * * * *